Patented Jan. 15, 1952

2,582,434

UNITED STATES PATENT OFFICE 2,582,434

PRODUCTION OF HYDROCARBON DRYING OILS HAVING IMPROVED DRYING CHARACTERISTICS

Alfred E. Hoffman, Clarendon Hills, and Herman S. Bloch, Chicago, Ill., assignors to Universal Oil Products Company, Chicago, Ill., a corporation of Delaware No Drawing. Application May 29, 1948, Serial No. 30,156

6 Claims. (Cl. 260—666)

This invention relates to a process for improving the properties and particularly the drying characteristics of hydrocarbon drying oils of the type comprising polyolefinic cyclic hydrocarbons having conjugated and non-conjugated unsaturation prepared by the conjunct polymerization of unsaturated, non-aromatic hydrocarbons in the presence of catalytic agents capable of effecting said conjunct polymerization reaction. More specifically, the invention concerns a method of converting the low boiling point fractions of said hydrocarbon drying oil into hydrocarbons of similar structure and of higher molecular weight, and consequently of lower volatility.

It is the principal object of the present invention to provide a process for increasing the average molecular weight of the hydrocarbon components contained in the low boiling point fractions of a mixture of polyolefinic cyclic hydrocarbons or conjunct polymers without substantially reducing the ability of said hydrocarbons to undergo oxidation and polymerization reactions involved in the so-called "drying" of said oils.

Another object of the process of this invention is to alter the volatility of a hydrocarbon drying oil containing polyolefinic cyclic hydrocarbon components, and in particular the low boiling point fractions thereof, to convert said hydrocarbons into polyolefinic cyclic hydrocarbons having a higher boiling point than the fraction subjected to such alterations which when incorporated into drying oil compositions, such as paints and varnishes do not vaporize to the atmosphere, but rather undergo oxidation and/or polymerization during the drying process such hydrocarbons undergo to form a portion of the ultimate protective film comprising the dried coating composition.

One method of improving the drying characteristics by reducing the volatility of a hydrocarbon drying oil of a type comprising a mixture of polyolefinic cyclic hydrocarbons containing conjugated and non-conjugated unsaturation and produced in a conjunct polymerization reaction comprises reacting a non-aromatic unsaturated hydrocarbon containing at least 3 carbon atoms per molecule with a conjunct polymerization catalyst to form a catalyst-hydrocarbon sludge, decomposing said sludge to recover therefrom said mixture of polyolefinic cyclic hydrocarbons, separating a fraction therefrom boiling below a temperature of from about 250° to about 350° C., reacting said fraction with a conjunct polymerization catalyst to form a sludge thereof and decomposing said last mentioned sludge to recover therefrom a mixture of polyolefinic cyclic hydrocarbons containing hydrocarbon components of higher average molecular weight than the hydrocarbon components of said fraction.

In accordance with a more specific embodiment of the process comprising the present invention, the low boiling fraction of a mixture of conjunct polymers containing polyolefinic cyclic hydrocarbons in which the unsaturation is both conjugated and non-conjugated is separated from a full boiling range mixture of said conjunct polymers prepared in a prior conjunct polymerization reaction and reacted with substantially anhydrous hydrofluoric acid at a temperature of from about —10° to about 200° C. to form a sludge containing hydrogen fluoride-hydrocarbon complex addition products and thereafter said hydrogen fluoride sludge is decomposed by means of a process and under conditions suitable for retaining the highly unsaturated character of the polyolefinic cyclic hydrocarbons or modified conjunct polymers contained in said sludge.

Other objects and embodiments of the present process relating to specific reaction conditions, particularly reactants suitable in the formation of said conjunct polymers and specific means for effecting the desired conversion will be referred to in greater detail in the following further description of the invention.

The art relating to conversion of hydrocarbons has heretofore recognized that certain types of hydrocarbons having a particular structure generally characterized as unsaturated non-aromatic hydrocarbons when contacted with certain inorganic catalytic agents, characterized broadly as acid-acting catalysts, at selected reaction conditions undergo a particular type of reaction or series of reactions to form a sludge type product containing a complex addition product of the catalyst and a mixture of so-called "conjunct hydrocarbon polymers." The latter mixture of hydrocarbons, recovered from the sludge by specific procedures is found to comprise highly unsaturated hydrocarbons containing components of high molecular weight and of generally monocyclic or polycyclic, non-aromatic structure in which the unsaturation is both of the conjugated and non-conjugated variety. The latter hydrocarbons have found a degree of utility in the protective coating industry as a drying oil component of such typical protective compositions as paints and varnishes and in this capacity have been found to be capable of reacting with atmospheric oxygen in the so-called "drying" reaction to yield a hard film somewhat similar in properties to the films produced by drying of the usual vegetable, animal and marine drying oils. The conjunct polymers, or hydrocarbon drying oils, as recovered from the sludge formed in a conjunct polymerization reaction contain relatively low molecular weight components, which, although possessing a highly unsaturated structure and although capable of undergoing oxidation and polymerization to yield a portion of the dried film under suitable conditions, tend to vaporize from the film exposed to atmospheric oxygen and are thus lost to the atmosphere before such components have the opportunity to become fixed in the film. In general, the components thus subject to evaporation are those relatively volatile hydrocarbons having a boiling point below about 300° C., the latter components boiling below this point, tending to vaporize more readily than components boiling at higher temperatures. Since the hydrocarbons contained in the low boiling point fractions are also of a highly unsaturated structure in which the olefinic double bonds contained therein are in conjugated and nonconjugated relationship to each other, the latter hydrocarbons are also subject to oxidation and polymerization on exposure to the atmosphere and would undergo drying to measurably increase the thickness and strength of the ultimate dried film were it not for the fact that the low boiling point fraction vaporizes to the atmosphere before becoming fixed in the film through the oxidation-polymerization mechanism. The present process is designed to alter the molecular weight and consequently the volatility of the hydrocarbons contained in the low boiling fraction by means of a polymerization reaction involving said hydrocarbons as at least a portion of the charging stock to the reaction. It is to be emphasized that the present procedure does not merely consist of a mere recycling as understood in the art, but involves a reconversion of the initial product of the conjunct polymerization reaction to effect what is believed to be a combination of isomerization and partial polymerization of the low molecular weight conjunct polymers formed in a prior conversion cycle. Thus, the process does not merely comprise a recycling of unconverted portions of the original charge but involves a distinct further conversion in its own right of conversion products from a previous cycle.

In preparing a full boiling range mixture of drying oils comprising the original mixture of conjunct hydrocarbon polymers from which the charging stock of the present process is isolated, a primary sludge is formed by reacting a hydrocarbon charging stock capable of undergoing a conjunct polymerization reaction, generally an unsaturated, non-aromatic hydrocarbon or an isoparaffin with certain optimum proportions of a conjunct polymerization catalyst at reaction conditions hereinafter specified. The properties of the ultimately recovered drying oil or conjunct polymers depend to some extent upon the type of hydrocarbons employed in the sludge-forming or conjunct polymerization reaction. Suitable hydrocarbon starting materials comprise, in general, the unsaturated hydrocarbons containing at least 3 carbon atoms per molecule such as mono-olefins, polyolefins and/or acetylenic hydrocarbons of either branched or straight chain structure. Cyclic olefins and isoparaffins may also be employed as a charging stock to the primary conjunct polymerization reaction, either individually or in admixture with, for example, mono- or polyolefins. When utilized as the major component of the charging stock, propylene is desirably admixed with higher molecular weight hydrocarbons and a larger ratio of conjunct polymerization catalyst to hydrocarbons is charged to the sludge forming reaction. A mixture of the various classes of hydrocarbons specified above may be utilized in preparation of the sludge, the proportion of aromatic hydrocarbons in the mixture desirably being small or preferably nil, since the latter hydrocarbons tend to reduce the yield of the sludge. Even in the case of the saturated isoparaffinic hydrocarbons, a conjunct polymerization reaction involving said hydrocarbons as charging stock is believed to be essentially the conversion of an unsaturated hydrocarbon, since they are considered to undergo a cracking or hydrogen transfer type of reaction during the formation of the sludge to form an unsaturated hydrocarbon which thereupon undergoes conjunct polymerization. An especially preferred charging stock from the standpoint of general availability and desirability in producing a sludge in high yields is an octene fraction of a selective or non-selective polymer gasoline (prepared by the copolymerization of various butylenes and/or propylenes) or the hexene-nonylene fraction of a propylene polymer. Other suitable hydrocarbon charging stock in the preparation of the present full boiling range mixture of conjunct polymers are the various fractions of normally cracked gasoline which have been reduced in aromatic content to render the same useful as charging stock in the present process.

The inorganic conjunct polymerization catalysts which when contacted with a hydrocarbon charging stock having the above enumerated properties yield a sludge containing complex addition products of the catalyst with the conjunct polymers formed in the reaction are generally characterized as acid-acting polymerization catalysts and are generally in a substantially anhydrous condition. The catalysts utilizable in the present process include certain members of the anhydrous Friedel-Crafts metal halide group and certain inorganic acids. Thus, anhydrous aluminum chloride and aluminum bromide either individually or in the presence of a promoter comprising hydrogen chloride or bromide are capable of effecting conjunct polymerization of the unsaturated hydrocarbon charging stock. Of the inorganic mineral acids utilizable as catalysts, sulfuric acid of a concentration usually above about 85%, and preferably from about 95 to about 100% concentration and hydrofluoric acid containing not over about 10% of water (preferably the substantially anhydrous reagent) comprise another group of the generally broad class of acid-acting catalysts utilizable to effect conjunct polymerization. Borontrifluoride in admixture with hydrogen fluoride or hydrofluoric acid, preferably mixtures containing at least about 10% hydrogen fluoride, may likewise be utilized in the present process as catalyst. Recycled hydrogen fluoride obtained by thermal or catalytic decomposition of a hydrogen fluoride sludge as hereinafter described with reference to one method of recovering the conjunct polymers may be employed as catalyst, since the decomposition may be effected under certain conditions to yield a recovered hydrogen fluoride containing from 98 to 100% hydrogen fluoride.

On contacting the hydrocarbon charging stock and acid-acting catalyst at reaction conditions specified, generally, as "sludge-forming" or "conjunct polymerization" reaction conditions, the catalyst in the initial stages of the reaction acts catalytically in effecting polymerization, cyclization, and hydrogen transfer between the hydrocarbon reactants charged to form high molecular weight, cyclic hydrocarbon compounds, some of which are saturated and the unsaturated portions of which combine with the catalyst in definite molecular proportions to form a catalyst-polyolefinic hydrocarbon addition complex comprising the sludge. The latter is a non-viscous liquid product of the reaction containing definite chemical compounds of the addition complex type but containing substantially no compounds having organically bound fluorine, chlorine, or sulfate radicals. The net result of the combined hydrogen transfer, polymerization and cyclization reactions (which, in effect, occur substantially as a simultaneous combination reaction referred to in the aggregate as a conjunct polymerization reaction) is the production of the polyolefinic cyclic hydrocarbons appearing in combination with the catalyst as the sludge. As a further result of the hydrogen transfer reactions occurring during conjunct polymerization, a portion of the hydrocarbon components of the reaction mixture becomes saturated to form a distinct phase in the mixture which separates from the sludge as an upper hydrocarbon layer readily separated from the lower sludge layer and which generally comprises both open-chain, and cyclic saturates.

The sludge-forming stage of the present process or the primary conjunct polymerization reaction is effected by contacting the hydrocarbon starting material of the aforementioned composition, preferably an olefinic charging stock composed of olefins having at least 3 carbon atoms per molecule with the conjunct polymerization catalyst at a temperature within the range of from about 0° C. to about 200° C., preferably from about 30° to about 125° C. and at superatmospheric pressure sufficient to maintain the reactants in substantially liquid phase. If the charging stock is isoparaffinic rather than olefinic, the higher temperatures in the ranges cited are required. The temperature conditions for each of the above classes of conjunct polymerization catalysts may vary depending upon the characteristics of the catalyst. For example, temperatures in the lower range of the above limits are utilized when sulfuric acid is employed as catalyst because of the oxidizing tendency of sulfuric acid at temperatures above about 150° C., the preferred reaction temperature for sulfuric acid being within the range of from about 0° to about 125° C. Observation has shown that substantially anhydrous hydrofluoric acid having a concentration greater than about 95% is the preferred conjunct polymerization catalyst, not only on the basis of superior yields and quality of the hydrocarbon product recovered from the sludge, but also from the standpoint of certain operating advantages, especially in the sludge decomposition stage where thermal methods of decomposition may be employed, making it possible to recover, for recycling purposes, a hydrogen fluoride effluent phase containing from about 98 to 100% anhydrous hydrogen fluoride. An optimum yield of sludge is obtained, which, when decomposed in accordance with the methods herein provided yields a drying oil having a maximum degree of unsaturation for the particular charging stock utilized, when the weight ratio of olefins to conjunct polymerization catalyst charged to the reaction zone is maintained within the range of from about 1.2 to about 3.5, preferably from about 1.7 to about 2.5.

At the above reaction conditions and when the reaction mixture of hydrocarbons and catalyst is mixed by some form of stirring device, sludge formation takes place very quickly, although the reaction may be allowed to continue for one or more hours to obtain peak production of the sludge. The increment in yield, however, becomes progressively smaller as the reaction time is increased and it is generally not practical to extend the reaction period for longer than about one-half hour. The liquid sludge phase and the upper layer saturated hydrocarbon phase, formed upon completion of the reaction, separate on standing, and the separate phases may be recovered by decanting the one from the other.

The conjunct polymers or polyolefinic cyclic hydrocarbon drying oil mixture may be recovered from the sludge by any suitable method, depending upon the catalyst utilized in the formation of the sludge, although certain procedures provide advantages in operation which are not common to the other presently known methods of sludge decomposition. One of such methods, applicable to any of the conjunct polymerization catalyst sludges hereinabove referred to, results in the production of a highly unsaturated product but reduces the concentration of the recovered catalyst phase to the point that it cannot be economically recovered for recycling purposes to the sludge-forming stage. This method which consists in hydrolyzing the sludge in an aqueous medium is effected by thoroughly mixing the sludge with water or a dilute alkali solution. During the hydrolysis, the unsaturated hydrocarbons released from the sludge form a separate phase and rise to the top of the mixture, while the water-soluble or water hydrolyzable catalyst enters the aqueous phase. In the case of the aluminum halides, the aqueous hydrolysis procedure hydrolyzes the catalyst chemically so that even by evaporation of the water, the original dehydrated aluminum halide can not be recovered as such. In the case of sulfuric acid and hydrogen fluoride, the water merely hydrolyzes the catalyst-conjunct polymer complex and the hydrated catalyst may be recovered from the aqueous phase by removing the water therefrom. The hydrolytic method, however, entails certain disadvantages; attending the high cost of the recovery procedure for reconcentrating the acid, for example, these methods also require the use of acid-resistant equipment, not only in the aqueous hydrolysis step but also in the distillation equipment for concentrating the aqueous acid and for converting the concentrate to anhydrous acid.

The ability to readily recover the conjunct polymerization catalyst in a nearly anhydrous state by means of an inexpensive procedure constitutes one of the chief advantages in the use of hydrogen fluoride as catalyst, since hydrogen fluoride may be vaporized from the sludge, cooled and reliquefied for recycling purposes. The decomposition of the sludge may thus be effected by merely heating the sludge until the hydrogen fluoride component thereof is removed by vaporization, leaving a hydrocarbonaceous residue in which the component hydrocarbons contain more or less unsaturation, depending upon the distillation time and conditions. The latter thermal decomposition method, however, as may be expected from the known catalytic activity of free anhydrous hydrogen fluoride, yields an inferior hydrocarbon product containing few, if any, conjugated olefinic bonds desired in the product for use as a drying oil and resin intermediate. The thermal decomposition method, however, may be modified to provide a method in which many of the disadvantages associated with the simple thermal decomposition are obviated. Such modified procedures involve decomposing the sludge in the presence of a sludge decomposition catalyst or in the presence of an inert diluent which dissolves the liberated sludge hydrocarbons immediately upon decomposition and removes them from contact with the free hydrogen fluoride. In the catalytic decomposition method the hydrogen fluoride sludge at a temperature of from about 50° to about 250° C. is charged into a reactor column packed with a catalytic material which enhances the decomposition of the sludge but retards the cracking and polymerization of the conjunct polymers released from the sludge. The hydrogen fluoride vapors, having a purity of from about 98 to 100% hydrogen fluoride, depending upon the temperature of operation, are taken overhead and condensed in auxiliary coolers, while the higher boiling conjunct polymer hydrocarbons are removed from the catalytic decomposition column as a bottoms fraction. The effective catalyst utilizable as packing materials in the catalytic decomposition column comprise certain metals which are resistant to corrosion by free hydrogen fluoride, and certain forms of carbon and metallic fluoride or oxyfluoride salts. Among the preferred catalysts for effecting the decomposition, copper and cobalt as well as certain brasses containing copper, lead and tin have been found to be some of the most effective in obtaining decomposition of the sludge and recovery of the hydrocarbon product in which the components contain a maximum of conjugated and non-conjugated unsaturation.

In the thermal decomposition method involving introduction of the hydrogen fluoride into a liquid pool of inert diluent, the temperature of the diluent is maintained sufficiently high so that the hydrogen fluoride released upon decomposition of the sludge is immediately vaporized and separated from the liquid hydrocarbon phase in the reactor. The temperature maintained in the reactor is, on the other hand, sufficiently below the boiling point of the conjunct polymer hydrocarbon product to insure that very little of the latter hydrocarbons are flashed into the hydrogen fluoride vapor outlet. Suitable inert liquids into which the hydrogen fluoride sludge is charged may be a hydrocarbon such as a paraffin or a naphtha boiling from about 50° to about 180° C., preferably from about 110 to about 140° C. Such hydrocarbons include the octanes, nonanes, decanes, or a mixture thereof such as a fraction of a straight run gasoline boiling in the above range, diethylcyclohexane, trimethylcyclohexane, etc. Other inert diluents include the haloalkanes such as bromo- or chloroheptane and various inorganic compounds such as salts melting below the above desired temperature range of operation and which are chemically stable to hydrogen fluoride. The heat of vaporization of the hydrogen fluoride and the heat of decomposition may be supplied in the decomposition zone by maintaining the inert diluent under reflux and allowing the hydrogen fluoride sludge to come into direct contact with the hot vapors from the reboiling section.

The mixture of hydrocarbons comprising the product of the conjunct polymerization reaction containing hydrocarbons having conjugated and non-conjugated unsaturation and recovered from the conjunct polymerization sludge contains a series of high molecular weight cyclic compounds of wide boiling range but of generally homologous structure, the cyclic portion of the hydrocarbons having a cyclopentenyl structure in which the olefin bond of the cyclopentene ring is typically in conjugation with an olefinic bond present in an alkenyl or alkapolyenyl side chain. Infrared and ultra violet absorption studies, as well as other analytical data determined on the recovered conjunct polymers, have indicated that the individual hydrocarbons are cyclic, although substantially non-aromatic, have isolated unsaturation in addition to conjugated unsaturation, and that the 4 carbon atoms which constitute the conjugated system are highly substituted, possessing, on the average, fewer than 2 hydrogen atoms per molecule as substituents. The hydrocarbons boil from about 150 to over 450° C., have bromine numbers above about 140 to about 200, maleic anhydride values of from about 30 to about 90, an average number of olefinic double bonds per molecule from about 2.5 to about 4, of which from about 40 to about 70% are conjugated and average molecular weights of from about 250 to about 400, although some components may have molecular weights as high as about 1000.

In accordance with the present method of operation, the low molecular weight, low boiling point components of the mixture of conjunct polymers recovered from the conjunct polymerization sludge are separated and recycled to the conjunct polymerization reaction. The mixture of conjunct polymers as recovered is desirably fractionated to separate a relatively low boiling fraction boiling below about 300° C. or below any other desired particular temperature. The separated low boiling range fraction may be contacted individually with the conjunct polymerization catalyst at reaction conditions within the values hereinabove specified for the primary conjunct polymerization reaction or the fraction may be admixed with the hydrocarbon charging stock to the primary conjunct polymerization reaction, for example, with a mono-olefin, in any proportion to form a conjunct copolymer therewith. When the separated low boiling point fraction is contacted individually with a conjunct polymerization catalyst, an upper saturated hydrocarbon layer generally does not form in the secondary conjunct polymerization reaction, but the entire charge reacts with the catalyst to form a sludge therefrom. The modified conjunct polymers may be recovered from the sludge by the methods hereinabove specified for the recovery of the full boiling range mixture of primary conjunct polymers, the recovered product generally having a boiling range similar to the boiling range of the product from the primary conjunct polymerization reaction. The recycling procedure, therefore, converts the fraction consisting entirely of low boiling point, low molecular weight conjunct polymers into a product which has a boiling range similar to the initial full boiling range product. In a typical recycling operation, for example, a fraction boiling up to about 300° C. is converted into a mixture of conjunct polymers of which 70% boil above about 300° C., up to above 450° C.

When the thermal or catalytic method of decomposing the primary hydrogen fluoride sludge is utilized to recover the initial polyolefinic, cyclic hydrocarbon product from which the recycle fraction is separated for purposes of the present operation, an alternative procedure may be employed which eliminates the necessity of fractionating the primary product and separating a specific fraction for recycle. In accordance with this modified alternative procedure, the low boiling fraction (for example, boiling below a temperature of about 300° C.) is vaporized from the sludge during the thermal or catalytic decomposition simultaneously with the hydrogen fluoride component of the sludge, such that the hydrocarbon fraction appears in the hydrogen fluoride condensate. The latter condensate may then be directly recycled to the decomposition column or diverted to the sludge-forming stage of the process where it may be admixed with additional hydrocarbon charging stock to form the primary sludge. The method is applied by merely raising the reflux temperature in the sludge decomposition column so that the vapor effluent contains the desired low-boiling hydrocarbon fraction together with the vaporized hydrogen fluoride.

In the recycling operation, comprising the essential feature of the present process, the low boiling point fraction may be reacted with a conjunct polymerization catalyst which is similar or different from the catalyst utilized in the primary conjunct polymerization reaction. Thus, a fraction recovered from an aluminum chloride sludge may be recycled and reacted with hydrogen fluoride to form a hydrogen fluoride sludge. The preferred catalyst, as in the primary conjunct polymerization reaction, is hydrofluoric acid containing less than 10% water.

The present invention will be further illustrated in the following examples which are presented for the purpose of indicating the process flow, and the general method of effecting the reaction and recovery of the product; the examples, however, should not be construed as unduly limiting the broad scope of the invention in accordance thereto.

*Example I*

A hydrocarbon drying oil comprising a mixture of polyolefinic cyclic hydrocarbons containing conjugated and non-conjugated unsaturation was prepared and recovered from a hydrogen fluoride conjunct polymerization sludge in accordance with the following procedure:

268 parts by weight of non-selective polymer gasoline (copolymers of propylene and butylenes) having a bromine number of approximately 132, an average molecular weight of approximately 105 and a boiling range of from about 28° to about 225° C. was gradually stirred into 222 parts by weight of liquid, substantially anhydrous hydrogen fluoride at a temperature of 93.5° C. for a reaction period of one hour, the polymer gasoline being added to the liquid hydrogen fluoride as the latter was stirred over a period of approximately one-half hour. The resulting hydrogen fluoride sludge was allowed to stand quiescent following the above reaction period and the emulsion-like mixture which characterized the product during the reaction separated into an upper, substantially saturated hydrocarbon phase (146.1 parts by weight) and a lower sludge phase containing 336.7 parts by weight of liquid sludge product. The latter sludge phase was decanted from the saturated hydrocarbon layer, extracted with an equal volume of pentane to remove entrained saturated hydrocarbons from the sludge and then allowed to run into a mixture of ice and water to hydrolyze the polyolefinic, cyclic hydrocarbon-hydrogen fluoride complex compounds contained in said sludge. The hydrolysis reaction resulted in the liberation of the conjunct polymer hydrocarbons which floated to the surface of the lower aqueous hydrofluoric acid phase. The hydrocarbon layer was withdrawn, and dried over calcium chloride. The conjunct hydrocarbon polymer product comprised 91.7 parts by weight, a total yield of 34.4%, based upon the quantity of gasoline charged to the reaction. The material had an initial boiling point of 152° C. and 90% distilled over at 418° C. The mixture of hydrocarbons had a bromine number of 178, a maleic anhydride value of 85 and a Gardner color rating of 13–14. A fraction of the material boiling up to about 300° C. (40% by volume of the full boiling range material, maleic anhydride value 95) was separated and reserved from the following experiments.

141 parts by weight of the fraction having an end boiling point of 300° C. was stirred into 222 parts by weight of liquid anhydrous hydrogen fluoride at a temperature of 93.5° C. and stirring was continued for an additional one hour. On settling, the reaction mixture formed a single phase, a hydrogen fluoride sludge and no upper saturated hydrocarbon phase. The sludge was added to a mixture of ice and water, with stirring, to hydrolyze the catalyst-hydrocarbon complexes contained in the sludge. The hydrolysis resulted in the liberation of the conjunct polymers which floated above the dilute aqueous hydrofluoric acid phase. 138 parts by weight of said conjunct polymer hydrocarbons was recovered. The latter product had a bromine number of 169, a maleic anhydride value of 80 and a Gardner color of 15. The product distilled at atmospheric pressure at an initial boiling point of 172° C. and 90% distilled over at a temperature of 415° C., with about 45% distilling above 300° C. (the end-point of the charge stock).

The results of the above Example I indicate that from a low boiling fraction (B. P.: 152–300° C.) may be prepared a full boiling range mixture of conjunct polymers (boiling up to about 450° C.) by separating the low boiling fraction and recycling the same to the conjunct polymerization reaction. The low boiling conjunct polymers, when allowed to remain in the full boiling range mixture and the latter utilized as a coating composition component, under "drying" conditions in which the composition is exposed to the atmosphere, rapidly evaporate and are lost to the atmosphere. By means of the present process, the low boiling components are converted into less volatile hydrocarbons of higher average molecular weight and with little processing loss.

*Example II*

A mixture of 190.5 parts by weight of the non-selective polymer gasoline utilized in Example I and 76.2 parts by weight of the low boiling fraction of the conjunct polymers (boiling up to about 300° C.), separated from the product of Example I, was stirred into 220 parts by weight of anhydrous hydrogen fluoride maintained at a temperature of 93.5° C. The resulting reaction mixture was stirred for an additional hour and the product then allowed to separate into an upper, substantially saturated hydrocarbon layer containing 91.4 parts by weight of said hydrocarbons and 393.6 parts by weight of a lower hydrogen fluoride sludge layer. The sludge layer was decanted, washed with pentane to remove entrained saturated hydrocarbons and allowed to run slowly into a stirred mixture of cracked ice and water. The resulting hydrolytic reaction yielded 165.6 parts by weight of conjunct polymers which were decanted from the resulting aqueous hydrofluoric acid phase and dried over calcium chloride. The resulting product had a bromine number of 168, a maleic anhydride value of 72 and a Gardner color rating of 13–14. The product distilled at an initial boiling point of 160° and 90% by volume distilled over at 410° C., with 60% boiling above 300° C.—an amount substantially greater than the high-boiling product which could be expected from the conversion of the non-selective polymer gasoline alone.

We claim as our invention:

1. A process for producing a drying oil which comprises subjecting a non-aromatic unsaturated hydrocarbon of at least 3 carbon atoms per molecule to conjunct polymerization in the presence of a conjunct polymerization catalyst, continuing the reaction until there is formed a catalyst-hydrocarbon sludge comprising a complex addition product of the catalyst with polyolefinic cyclic hydrocarbons containing conjugated and non-conjugated unsaturation and boiling above and below 300° C., separating said sludge from the hydrocarbon products of the conjunct polymerization reaction, decomposing the separated sludge to recover therefrom a mixture of said polyolefinic cyclic hydrocarbons, fractionating said mixture to separate therefrom polyolefinic cyclic hydrocarbons boiling below about 300° C., supplying the latter to the conjunct polymerization step for further conversion therein to higher molecular weight hydrocarbons and reaction with conjunct polymerization catalyst as aforesaid, and recovering the remainder of said mixture as the drying oil product of the process.

2. The process of claim 1 further characterized in that the conjunct polymerization catalyst comprises hydrogen fluoride.

3. The process of claim 1 further characterized in that said non-aromatic unsaturated hydrocarbon is an olefin.

4. The process of claim 1 further characterized in that said sludge is decomposed by hydrolyzing the same with water.

5. The process of claim 1 further characterized in that said sludge is thermally decomposed.

6. The process of claim 1 further characterized in that the conjunct polymerization catalyst comprises hydrogen fluoride and in that said sludge is decomposed at a temperature sufficient to vaporize its hydrogen fluoride content and said polyolefinic cyclic hydrocarbons boiling below about 300° C., said hydrogen fluoride content being supplied to the conjunct polymerization step together with said polyolefinic cyclic hydrocarbons boiling below about 300° C.

ALFRED E. HOFFMAN.
HERMAN S. BLOCH.

REFERENCES CITED

The following references are of record in the file of this patent:

UNITED STATES PATENTS

| Number | Name | Date |
| --- | --- | --- |
| 2,035,455 | Bjerregaard | Mar. 31, 1936 |
| 2,131,195 | Schneider et al. | Sept. 27, 1938 |
| 2,240,081 | Thomas | Apr. 29, 1941 |
| 2,400,521 | Kuhn | May 21, 1946 |
| 2,440,459 | Bloch | Apr. 27, 1948 |
| 2,440,477 | Johnstone | Apr. 27, 1948 |
| 2,481,498 | Carnell | Sept. 13, 1949 |